US010696096B2

(12) United States Patent
Van Riper et al.

(10) Patent No.: US 10,696,096 B2
(45) Date of Patent: *Jun. 30, 2020

(54) NON-PNEUMATIC TIRE

(71) Applicant: THE GOODYEAR TIRE & RUBBER COMPANY, Akron, OH (US)

(72) Inventors: Philip Carl Van Riper, Cuyahoga Falls, OH (US); Joseph Carmine Lettieri, Hudson, OH (US); Rebecca Anne Bandy, Cuyahoga Falls, OH (US); Addison Brian Siegel, Cuyahoga Falls, OH (US); Mahdy Malekzadeh Moghani, Cuyahoga Falls, OH (US); Andrew Brent Mendenhall, Mooresville, IN (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/292,165

(22) Filed: Oct. 13, 2016

(65) Prior Publication Data

US 2017/0157984 A1 Jun. 8, 2017

Related U.S. Application Data

(60) Provisional application No. 62/264,542, filed on Dec. 8, 2015.

(51) Int. Cl.
*B60C 7/14* (2006.01)
*B60C 7/18* (2006.01)

(52) U.S. Cl.
CPC .................. *B60C 7/14* (2013.01); *B60C 7/18* (2013.01); *B60C 2007/146* (2013.01)

(58) Field of Classification Search
CPC .. B60C 7/10; B60C 7/102; B60C 7/14; B60C 7/18; B60C 2007/107; B60C 2007/146
See application file for complete search history.

(56) References Cited

U.S. PATENT DOCUMENTS 4,280,736 A 7/1981 Raudman
6,170,544 B1 1/2001 Hottebart
(Continued)

FOREIGN PATENT DOCUMENTS

CN 104669944 A 6/2015
EP 3144159 A1 3/2017
(Continued)

OTHER PUBLICATIONS

European Search Report dated Sep. 7, 2017 for Application Serial No. EP16199951.
(Continued)

*Primary Examiner* — Kip T Kotter
(74) *Attorney, Agent, or Firm* — June E. Rickey

(57) ABSTRACT

A structurally supported tire includes a ground contacting annular tread portion, an annular shear band and at least one spoke disk connected to the shear band, wherein the spoke disk has at least two spokes, wherein each spoke extends between an outer ring and an inner ring, wherein one of the spokes extends from the outer ring to the inner ring in a curved manner. The second spoke extends from the outer ring to the inner ring in a straight manner.

9 Claims, 21 Drawing Sheets

(56) References Cited

U.S. PATENT DOCUMENTS

| | | | |
|---|---|---|---|
| 6,681,822 B2 | 1/2004 | Adams et al. | |
| 6,726,292 B1 | 4/2004 | Schroeder et al. | |
| 6,769,465 B2 | 8/2004 | Rhyne | |
| 7,201,194 B2 | 4/2007 | Rhyne | |
| 7,950,428 B2 | 5/2011 | Hanada et al. | |
| 8,276,628 B2 | 10/2012 | Hanada et al. | |
| 8,491,981 B2 | 7/2013 | Delfino et al. | |
| 8,883,283 B2 | 11/2014 | Delfino et al. | |
| 8,962,120 B2 | 2/2015 | Delfino | |
| 8,973,637 B2 | 3/2015 | Van Riper | |
| 8,999,480 B2 | 4/2015 | Summers et al. | |
| 9,387,726 B2 | 7/2016 | Choi et al. | |
| 2002/0096237 A1 | 7/2002 | Burhoe et al. | |
| 2004/0012246 A1* | 1/2004 | Rhyne | B60B 1/0223 301/55 |
| 2004/0159385 A1 | 8/2004 | Rhyne | |
| 2004/0187996 A1* | 9/2004 | Grah | B60C 1/00 152/516 |
| 2006/0113016 A1* | 6/2006 | Cron | B60C 7/18 152/11 |
| 2007/0089820 A1* | 4/2007 | Gabrys | B60B 7/0086 152/69 |
| 2007/0267116 A1* | 11/2007 | Rhyne | B60C 7/18 152/246 |
| 2008/0053586 A1 | 3/2008 | Hanada et al. | |
| 2009/0211674 A1 | 8/2009 | Hanada et al. | |
| 2009/0283185 A1 | 11/2009 | Manesh et al. | |
| 2009/0294000 A1 | 12/2009 | Cron | |
| 2010/0193097 A1 | 8/2010 | McNier et al. | |
| 2010/0307653 A1 | 12/2010 | Delfino et al. | |
| 2011/0011506 A1 | 1/2011 | Manesh et al. | |
| 2011/0024008 A1 | 2/2011 | Manesh et al. | |
| 2011/0079335 A1 | 4/2011 | Manesh et al. | |
| 2011/0108173 A1 | 5/2011 | Abe | |
| 2011/0260525 A1 | 10/2011 | Delfino | |
| 2012/0067481 A1 | 3/2012 | Cron | |
| 2012/0160392 A1 | 6/2012 | Van Riper | |
| 2012/0193004 A1 | 8/2012 | Anderson et al. | |
| 2012/0318417 A1* | 12/2012 | Dotson | B60C 7/10 152/17 |
| 2013/0160913 A1 | 6/2013 | Lonkar | |
| 2014/0000777 A1 | 1/2014 | Choi | |
| 2015/0174954 A1 | 6/2015 | Asper | |
| 2015/0246577 A1* | 9/2015 | Fudemoto | B60B 9/04 152/84 |
| 2016/0280005 A1 | 9/2016 | Cron | |
| 2017/0057294 A1* | 3/2017 | Iwamura | B60C 11/0041 |
| 2017/0072746 A1* | 3/2017 | Iwamura | B29D 30/02 |
| 2017/0080756 A1 | 3/2017 | Van Riper | |
| 2017/0106699 A1* | 4/2017 | Iwamura | B60C 11/032 |
| 2017/0113488 A1* | 4/2017 | Iwamura | B60C 7/102 |
| 2017/0113491 A1* | 4/2017 | Iwamura | B60B 27/06 |
| 2017/0157983 A1 | 6/2017 | Siegel | |
| 2017/0174005 A1 | 6/2017 | Van Riper | |
| 2017/0197467 A1* | 7/2017 | Iwamura | B60C 7/102 |

FOREIGN PATENT DOCUMENTS

| | | | |
|---|---|---|---|
| EP | 3178664 A1 | 6/2017 | |
| JP | 2012240525 A | 12/2012 | |
| KR | 20040027984 A1 | 4/2004 | |
| KR | 20120063616 A | 6/2012 | |
| KR | 20140001048 A | 1/2014 | |
| WO | WO-2014036415 A1 * | 3/2014 | B60C 7/10 |
| WO | 2015058181 A1 | 4/2015 | |
| WO | 2016109557 A1 | 7/2016 | |
| WO | 2016126983 A1 | 8/2016 | |

OTHER PUBLICATIONS

European Search Report dated Apr. 20, 2017 for Application Serial No. EP16199951.

* cited by examiner

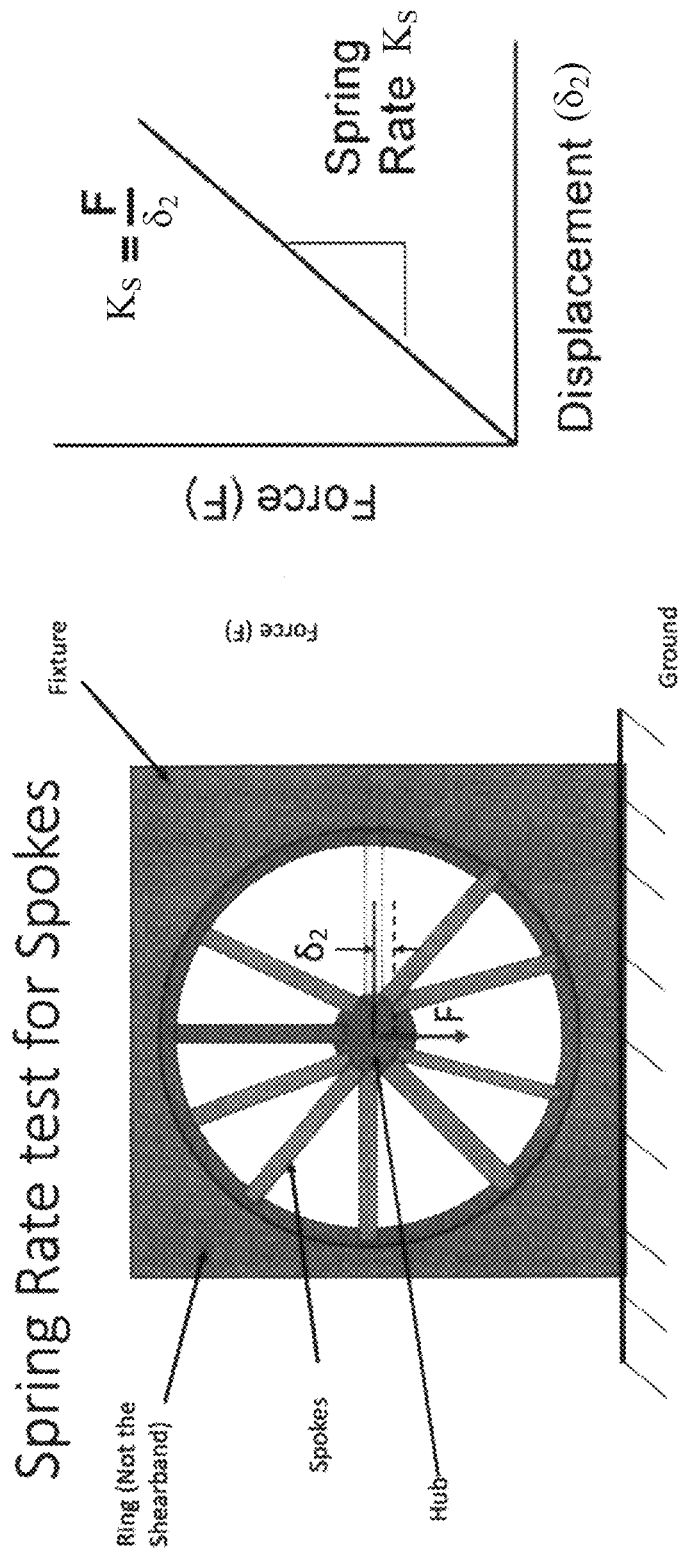

NON-PNEUMATIC TIRE

FIELD OF THE INVENTION

The present invention relates generally to vehicle tires and non-pneumatic tires, and more particularly, to a non-pneumatic tire.

BACKGROUND OF THE INVENTION

The pneumatic tire has been the solution of choice for vehicular mobility for over a century. The pneumatic tire is a tensile structure. The pneumatic tire has at least four characteristics that make the pneumatic tire so dominate today. Pneumatic tires are efficient at carrying loads, because all of the tire structure is involved in carrying the load. Pneumatic tires are also desirable because they have low contact pressure, resulting in lower wear on roads due to the distribution of the load of the vehicle. Pneumatic tires also have low stiffness, which ensures a comfortable ride in a vehicle. The primary drawback to a pneumatic tire is that it requires compressed fluid. A conventional pneumatic tire is rendered useless after a complete loss of inflation pressure.

A tire designed to operate without inflation pressure may eliminate many of the problems and compromises associated with a pneumatic tire. Neither pressure maintenance nor pressure monitoring is required. Structurally supported tires such as solid tires or other elastomeric structures to date have not provided the levels of performance required from a conventional pneumatic tire. A structurally supported tire solution that delivers pneumatic tire-like performance would be a desirous improvement.

Non pneumatic tires are typically defined by their load carrying efficiency. "Bottom loaders" are essentially rigid structures that carry a majority of the load in the portion of the structure below the hub. "Top loaders" are designed so that all of the structure is involved in carrying the load. Top loaders thus have a higher load carrying efficiency than bottom loaders, allowing a design that has less mass.

Thus an improved non-pneumatic tire is desired that has all the features of the pneumatic tires without the drawback of the need for air inflation is desired.

BRIEF DESCRIPTION OF THE DRAWINGS

The present invention will be better understood through reference to the following description and the appended drawings, in which:

FIG. 17a illustrates a spring rate test for a shear band, while

FIG. 18a illustrates a spring rate test for a spoke disk, while FIG. 18b illustrates the spring rate k determined from the slope of the force displacement curve.

FIG. 19a illustrates a spring rate test for a spoke disk, while

DEFINITIONS

The following terms are defined as follows for this description.

"Equatorial Plane" means a plane perpendicular to the axis of rotation of the tire passing through the centerline of the tire.

"Meridian Plane" means a plane parallel to the axis of rotation of the tire and extending radially outward from said axis.

"Hysteresis" means the dynamic loss tangent measured at 10 percent dynamic shear strain and at 25° C.

DETAILED DESCRIPTION OF THE INVENTION

Figure 1A:
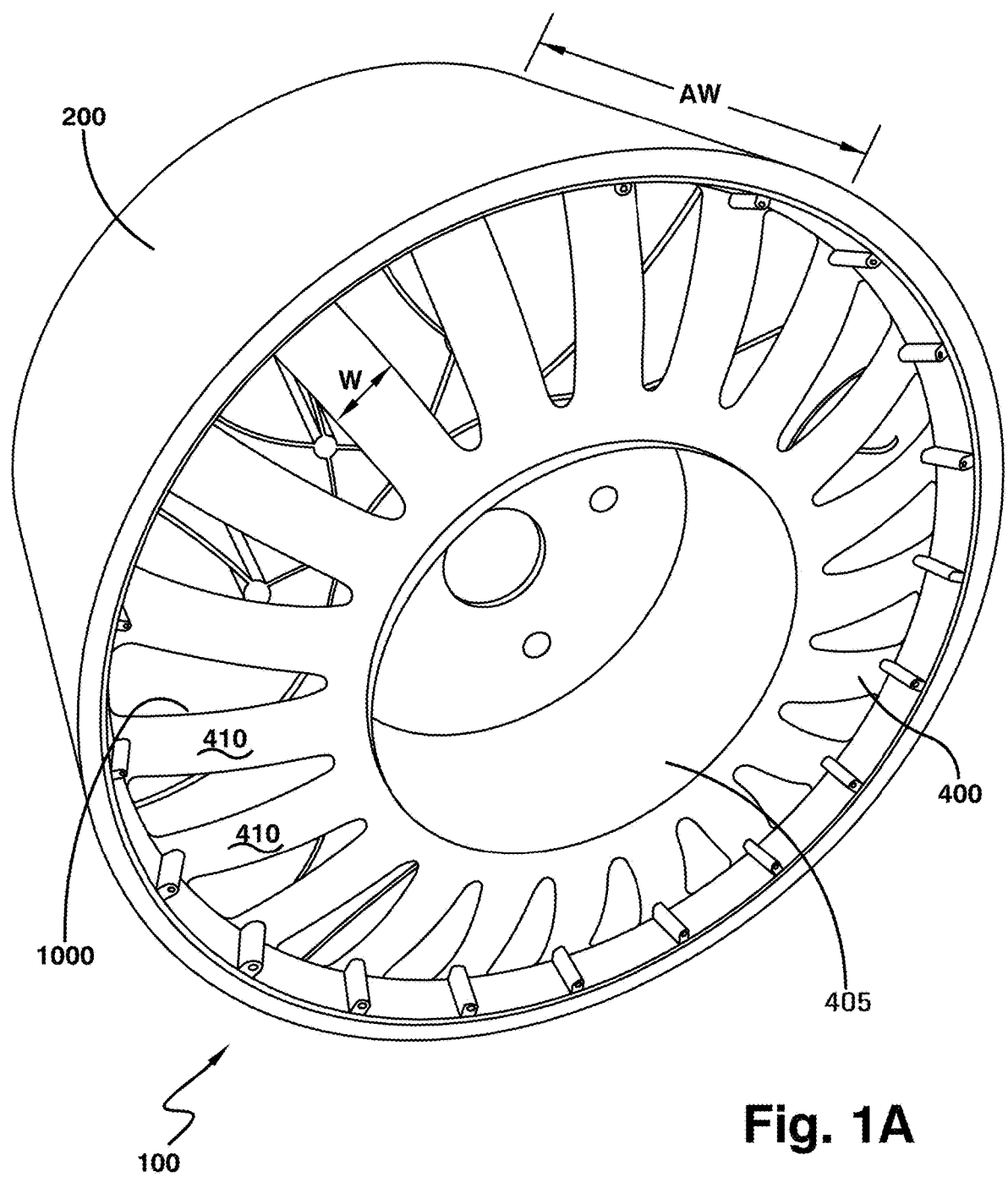
FIG. 1A is a perspective view of a first embodiment of a non-pneumatic tire of the present invention.
Figure 1B:
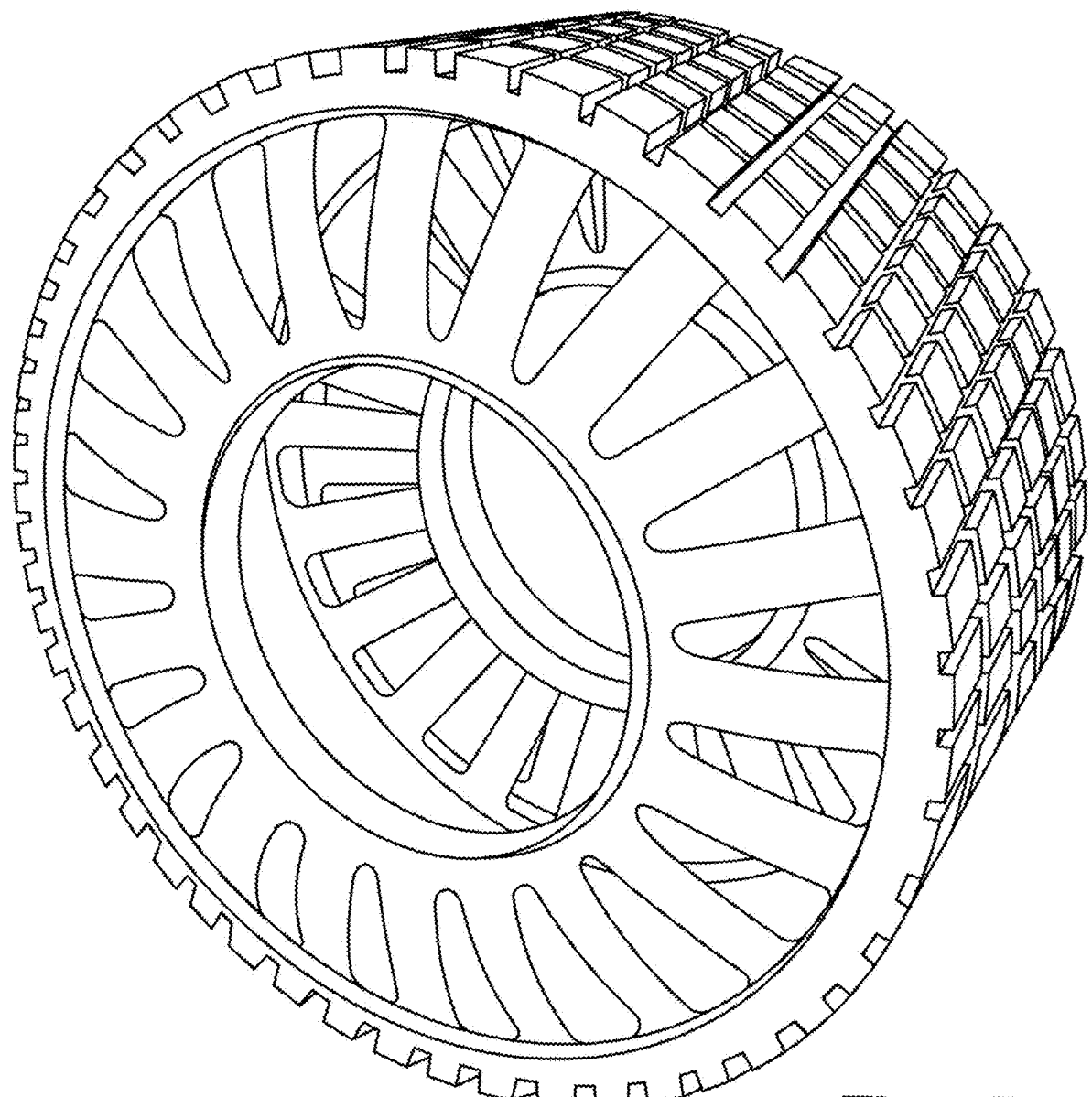
FIG. 1B is a perspective view of a second embodiment of a non-pneumatic tire of the present invention.
Figure 1C:
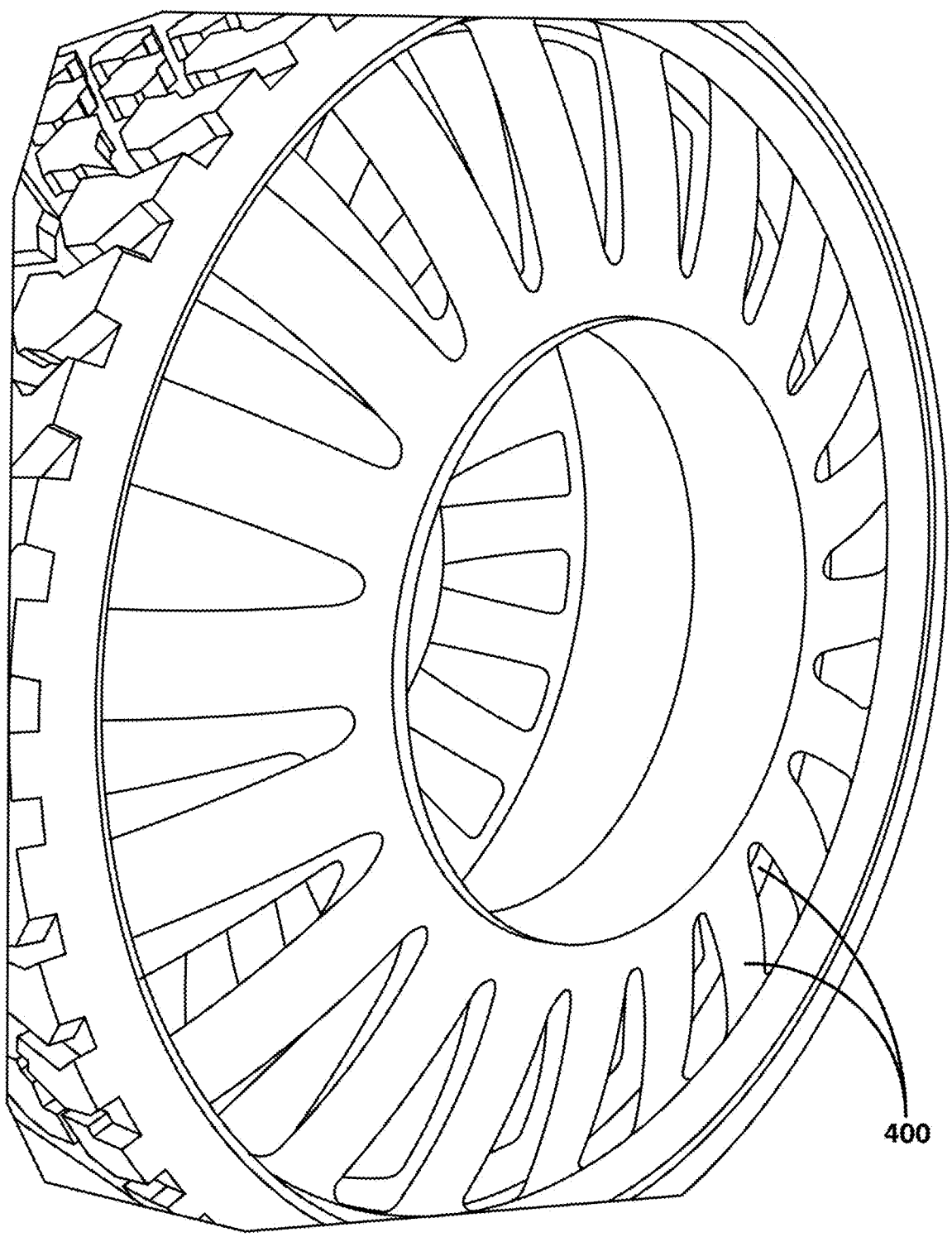
FIG. 1C is a perspective view of a third embodiment of a non-pneumatic tire of the present invention.

Examples of a non-pneumatic tire 100 of the present invention are shown in FIGS. 1A-1C. The tire of the present invention includes a radially outer ground engaging tread 200, a shear band 300, and one or more spoke disks 400. The spoke disks 400 may have different designs, as described in more detail, below. The non-pneumatic tire of the present invention is designed to be a top loading structure, so that the shear band 300 and the one or more spoke disks 400 efficiently carry the load. The shear band 300 and the spoke disks 400 are designed so that the stiffness of the shear band is directly related to the spring rate of the tire. The spokes of each disk are designed to be stiff structures that buckle or deform in the tire footprint and do not compress or carry a compressive load. This allows the rest of the spokes not in the footprint area the ability to carry the load. Since there are more spokes outside of the footprint than in, the load per spoke would be small enabling smaller spokes to carry the tire load which gives a very load efficient structure. Not all spokes will be able to elastically buckle and will retain some portion of the load in compression in the footprint. It is desired to minimize this load for the reason above and to allow the shearband to bend to overcome road obstacles. The approximate load distribution is such that approximately 90-100% of the load is carried by the shear band and the upper spokes, so that the lower spokes carry virtually zero of the load, and preferably less than 10%.

The non-pneumatic tire may have different combination of spoke disks in order to tune the non-pneumatic tire with desired characteristics. For example, a first spoke disk 400 may be selected that carries both shear load and tensile load. A second spoke disk may be selected that carries a pure tensile load. A third spoke disk 1000,2000 may be selected that is stiff in the lateral direction. See exemplary tire disk configurations as shown in FIGS. 1A-1C.

The tread portion 200 may have no grooves or may have a plurality of longitudinally oriented tread grooves forming essentially longitudinal tread ribs there between. Ribs may be further divided transversely or longitudinally to form a tread pattern adapted to the usage requirements of the particular vehicle application. Tread grooves may have any depth consistent with the intended use of the tire. The tire tread 200 may include elements such as ribs, blocks, lugs, grooves, and sipes as desired to improve the performance of the tire in various conditions.

Shear Band

Figure 5:
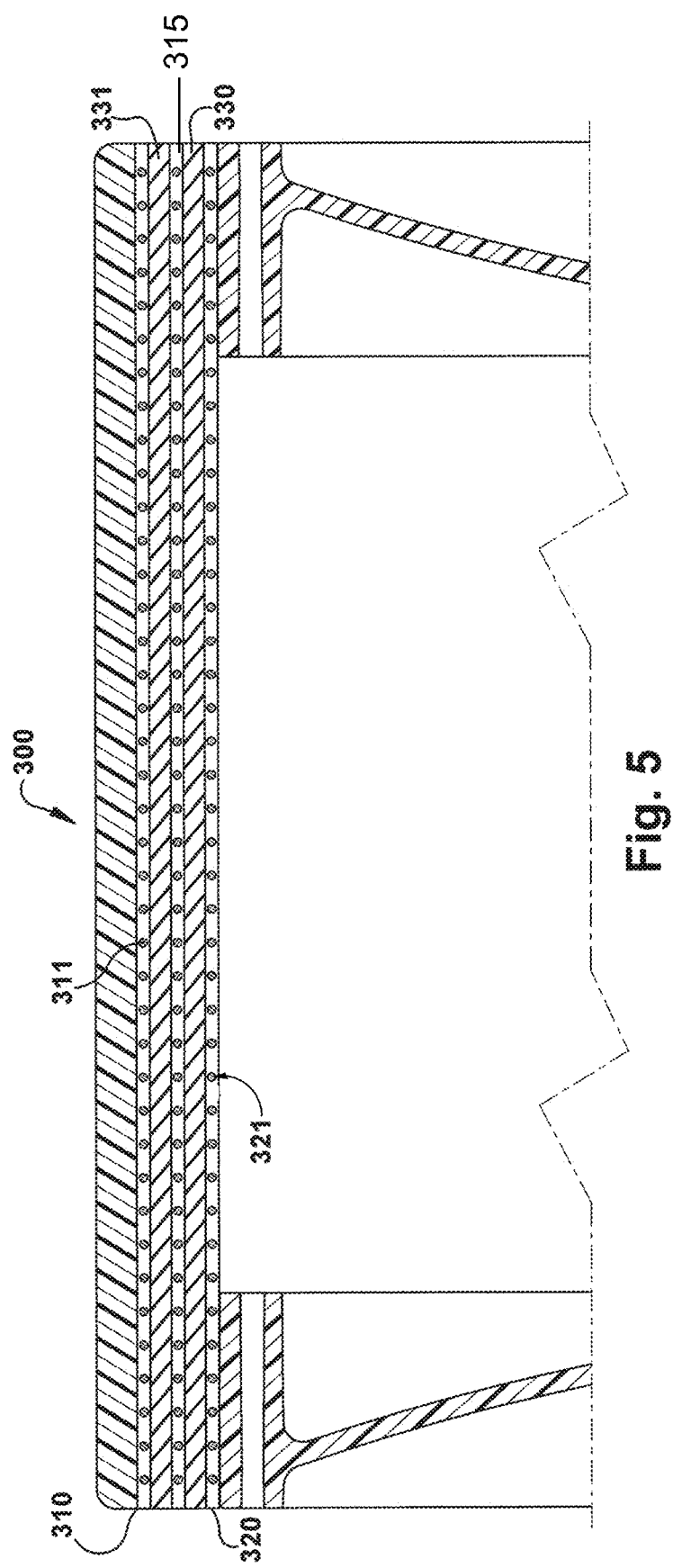
FIG. 5 is a cross-sectional view of the non-pneumatic tire of FIG. 1.

The shear band 300 is preferably annular, and is shown in FIG. 5. The shear band 300 is located radially inward of the tire tread 200. The shear band 300 includes a first and second reinforced elastomer layer 310,320. In a first embodiment of a shear band 300, the shear band is comprised of two inextensible layers arranged in parallel, and separated by a shear matrix 330,331 of elastomer. Each inextensible layer 310,320 may be formed of parallel inextensible reinforcement cords 311,321 embedded in an elastomeric coating. The reinforcement cords 311,321 may be steel, aramid, or other inextensible structure. In a second embodiment of the shear band, the shear band 300 further includes a third reinforced elastomer layer 315 located between the first and second reinforced elastomer layers 310,320.

In the first reinforced elastomer layer 310, the reinforcement cords 311 are oriented at an angle in the range of 0 to about +/−10 degrees relative to the tire equatorial plane. In the second reinforced elastomer layer 320, the reinforcement cords 321 are oriented at an angle in the range of 0 to about +/−10 degrees relative to the tire equatorial plane. Preferably, the angle of the first layer is in the opposite direction of the angle of the reinforcement cords in the second layer.

The shear matrix 330,331 has a thickness in the range of about 0.10 inches to about 0.2 inches, more preferably about 0.15 inches. The shear matrix 330,331 is preferably formed of an elastomer material having a shear modulus Gm in the range of 15 to 80 MPa, and more preferably in the range of 40 to 60 MPA.

The shear band has a shear stiffness GA. The shear stiffness GA may be determined by measuring the deflection on a representative test specimen taken from the shear band. The upper surface of the test specimen is subjected to a lateral force F as shown below. The test specimen is a representative sample taken from the shear band and having the same radial thickness as the shearband. The shear stiffness GA is then calculated from the following equation:

The shear band has a bending stiffness EI. The bending stiffness EI may be determined from beam mechanics using the three point bending test. It represents the case of a beam resting on two roller supports and subjected to a concentrated load applied in the middle of the beam. The bending stiffness EI is determined from the following equation: $EI=PL^3/48*\Delta X$, where P is the load, L is the beam length, and $\Delta X$ is the deflection.

It is desirable to maximize the bending stiffness EI of the shearband and minimize the shear band stiffness GA. The acceptable ratio of GA/EI would be between 0.01 and 20, with an ideal range between 0.01 and 5. EA is the extensible stiffness of the shear band, and it is determined experimentally by applying a tensile force and measuring the change in length. The ratio of the EA to EI of the shearband is acceptable in the range of 0.02 to 100 with an ideal range of 1 to 50.

The shear band 300 preferably can withstand a maximum shear strain in the range of 15-30%.

Figure 19B:
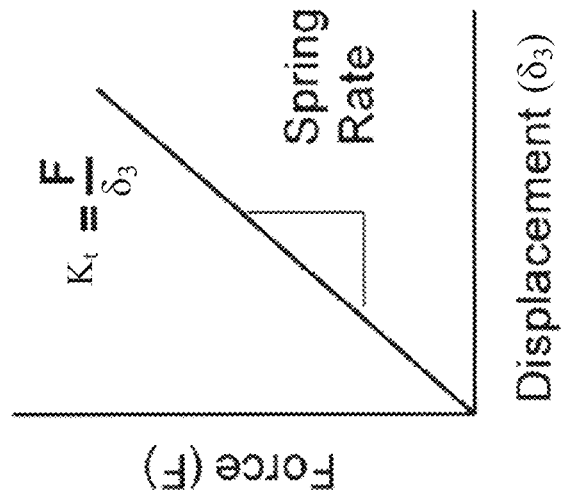
FIG. 19b illustrates the tire spring rate k determined from the slope of the force displacement curve.
Figure 19A:
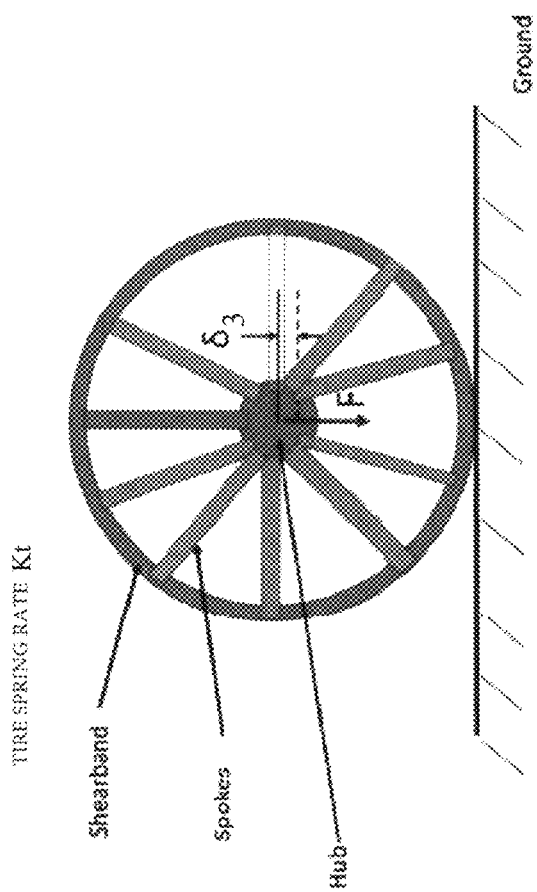
Figure 20:
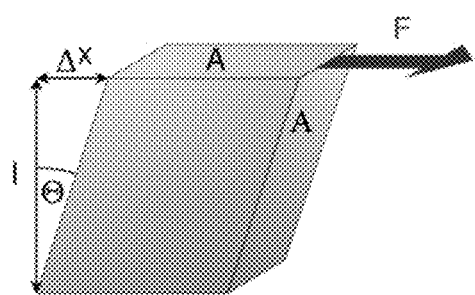
FIG. 20 illustrates how the shear stiffness is determined on a test specimen.

The non-pneumatic tire has an overall tire spring rate $k_t$ that is determined experimentally. The non-pneumatic tire is mounted upon a rim, and a load is applied to the center of the tire through the rim, as shown in FIG. 19a. The tire spring rate $k_t$ is determined from the slope of the curve of force versus deflection $\delta_3$, as shown in FIG. 19b. Depending upon the desired application, the tire spring rate $k_t$ may vary. The tire spring rate $k_t$ is preferably in the range of 650 to 1200 lbs/inch for a lawn mower or slow speed vehicle application.

Figure 17A:
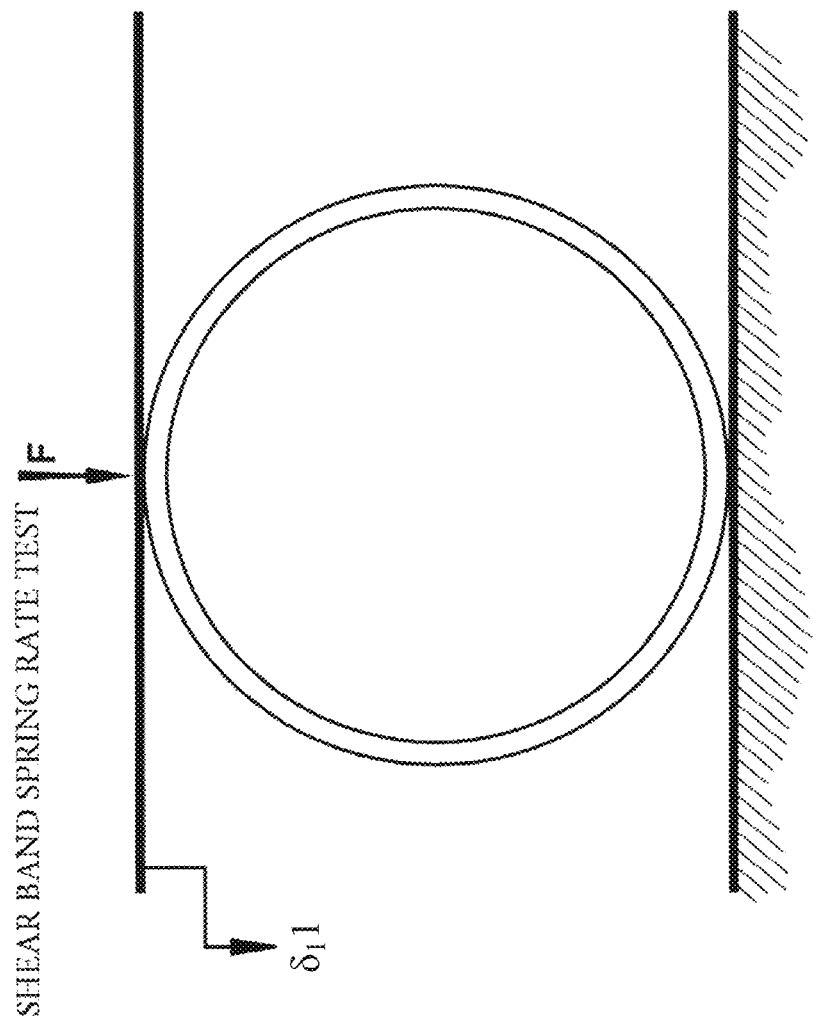
Figure 17B:
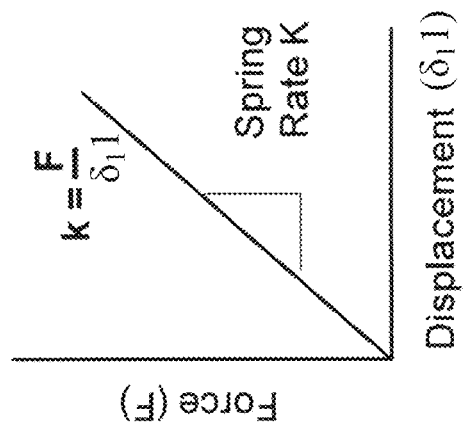
FIG. 17b illustrates the spring rate k determined from the slope of the force displacement curve.

The shear band has a spring rate k that may be determined experimentally by exerting a downward force on a horizontal plate at the top of the shear band and measuring the amount of deflection $\delta_1$ as shown in FIG. 17a. The spring rate is determined from the slope of the Force versus deflection curve as shown in FIG. 17b.

The invention is not limited to the shear band structure disclosed herein, and may comprise any structure which has a GA/EI in the range of 0.01 to 20, or a EA/EI ratio in the range of 0.02 to 100, or a spring rate in the range of 20 to 2000, as well as any combinations thereof. More preferably, the shear band has a GA/EI ratio of 0.01 to 5, or an EA/EI ratio of 1 to 50, or a spring rate of 170 lb/in, and any subcombinations thereof. The tire tread is preferably wrapped about the shear band and is preferably integrally molded to the shear band.

Spoke Disk

Figure 2:
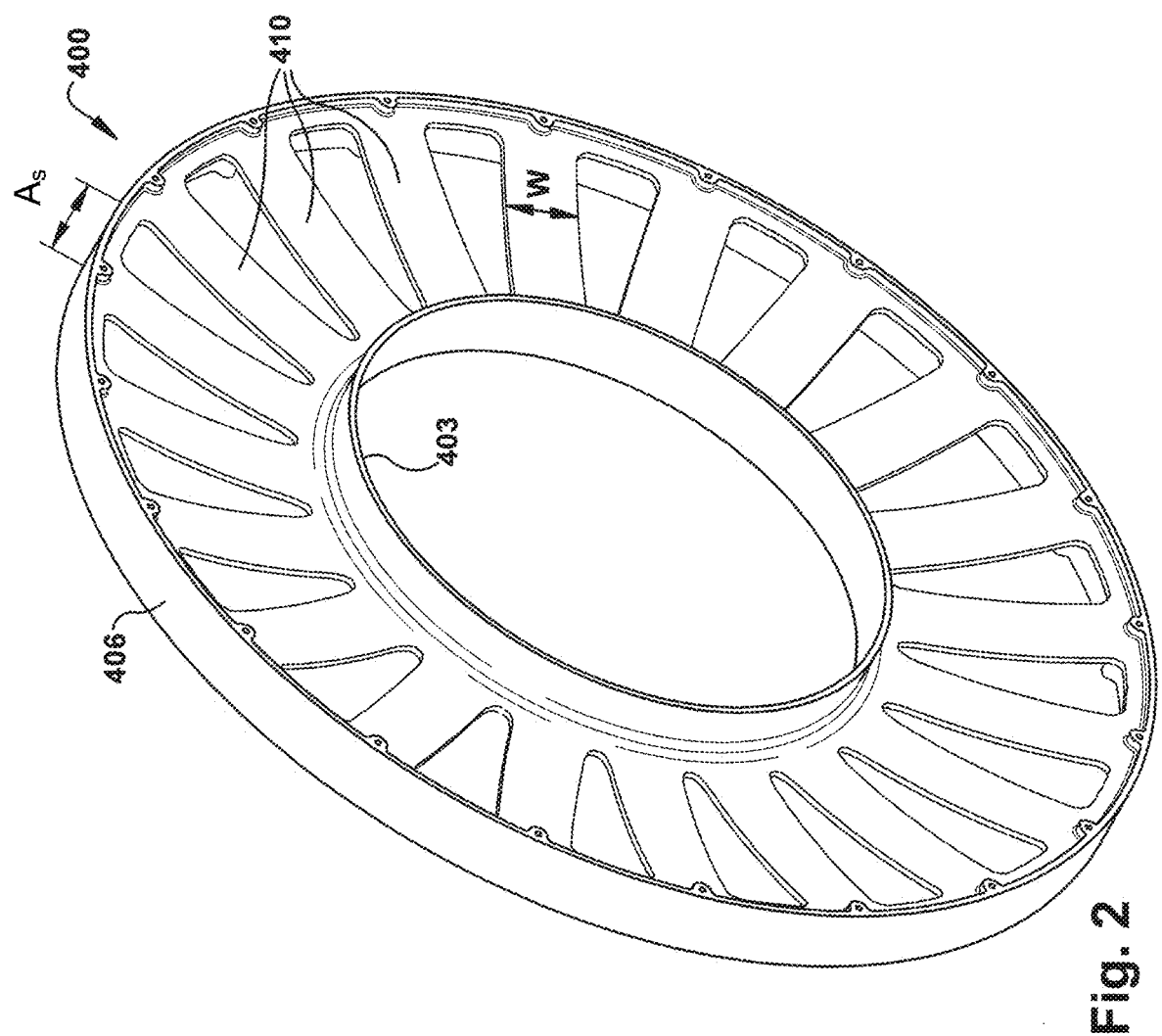
FIG. 2 is a perspective front view of a first embodiment of a spoke disk.
Figure 4:
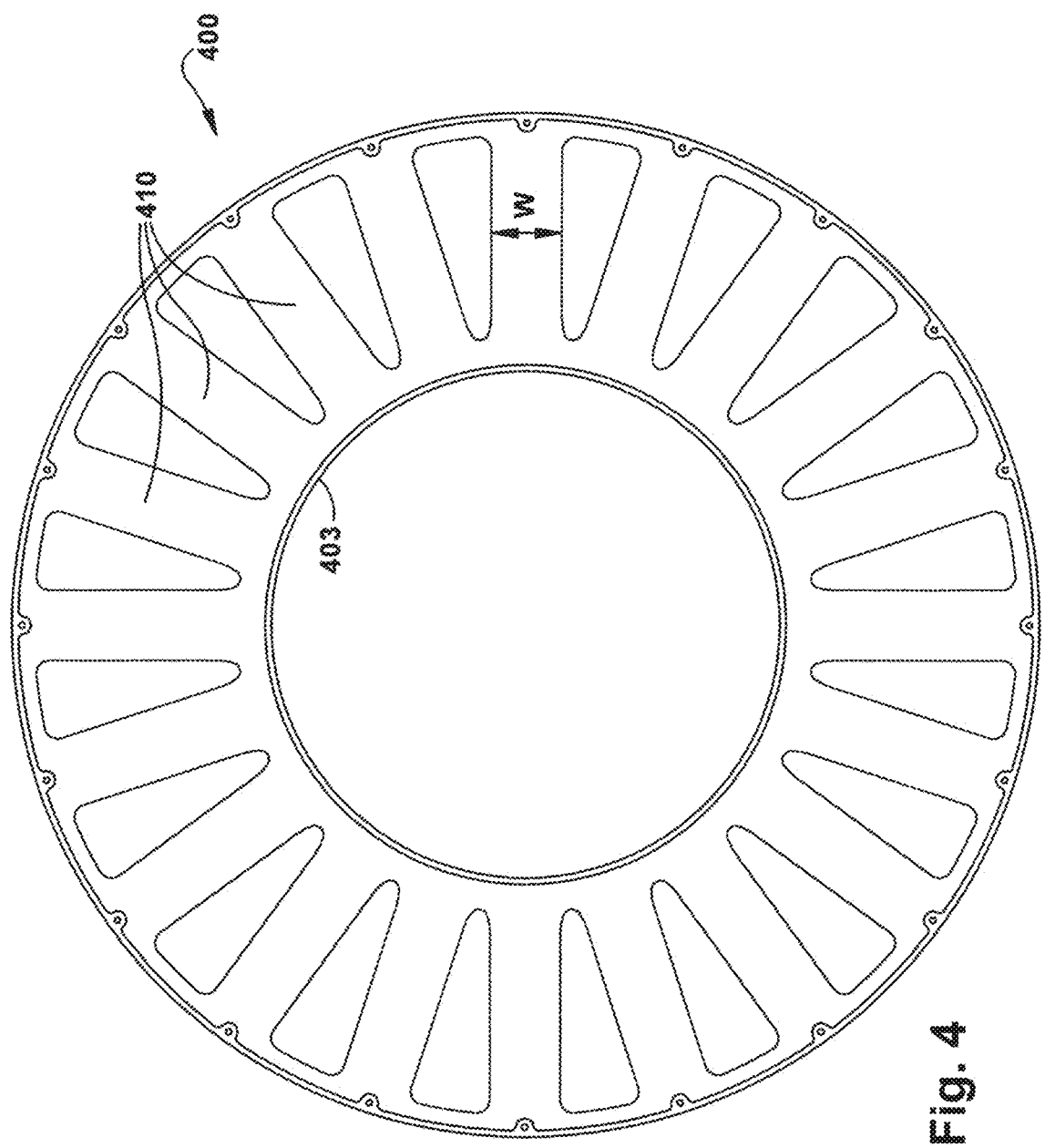
FIG. 4 is a front view of the first embodiment of the spoke disk of FIG. 2.
Figure 7:
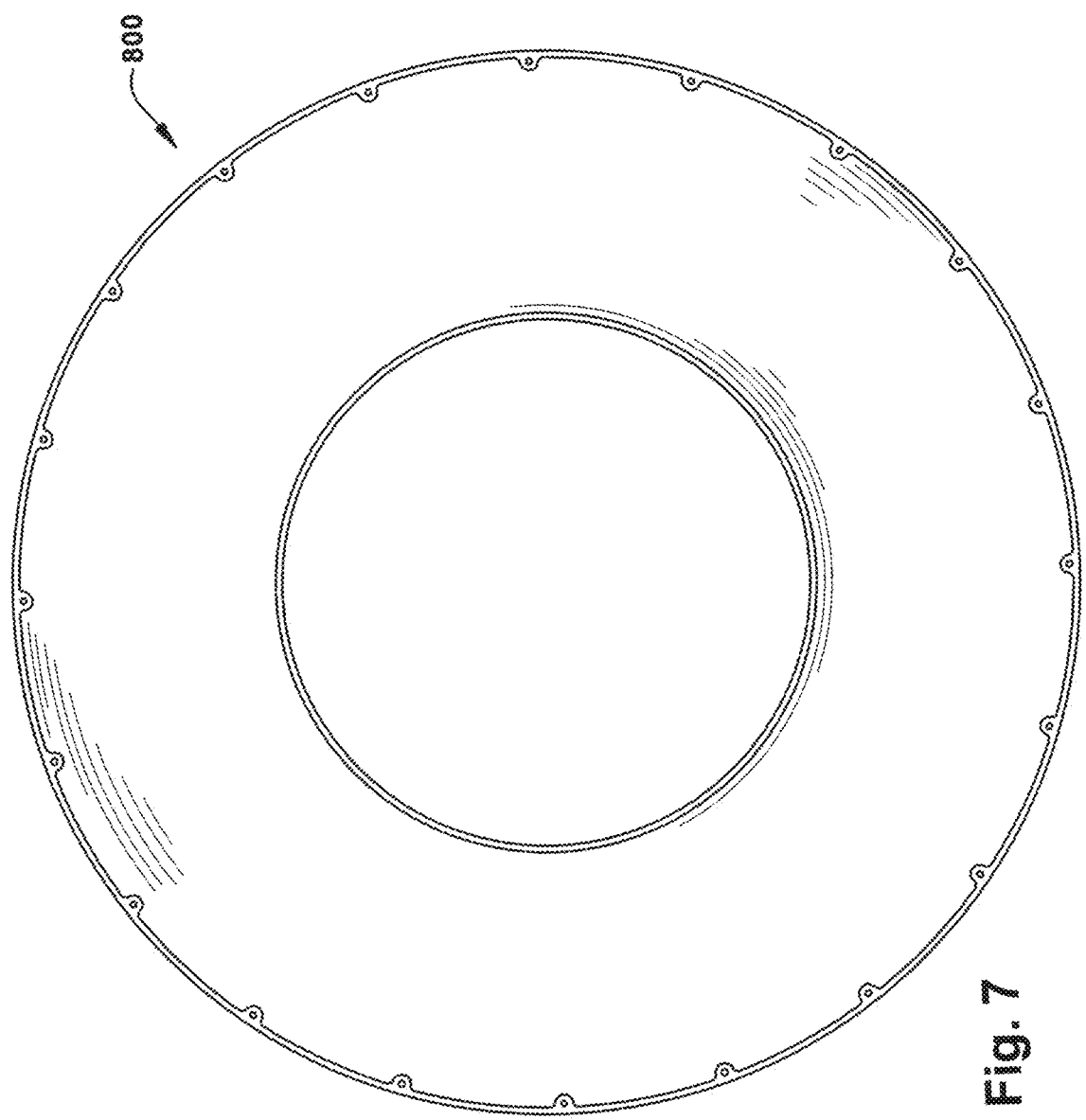
FIG. 7 is a third embodiment of a spoke disk of the present invention.
Figure 8:
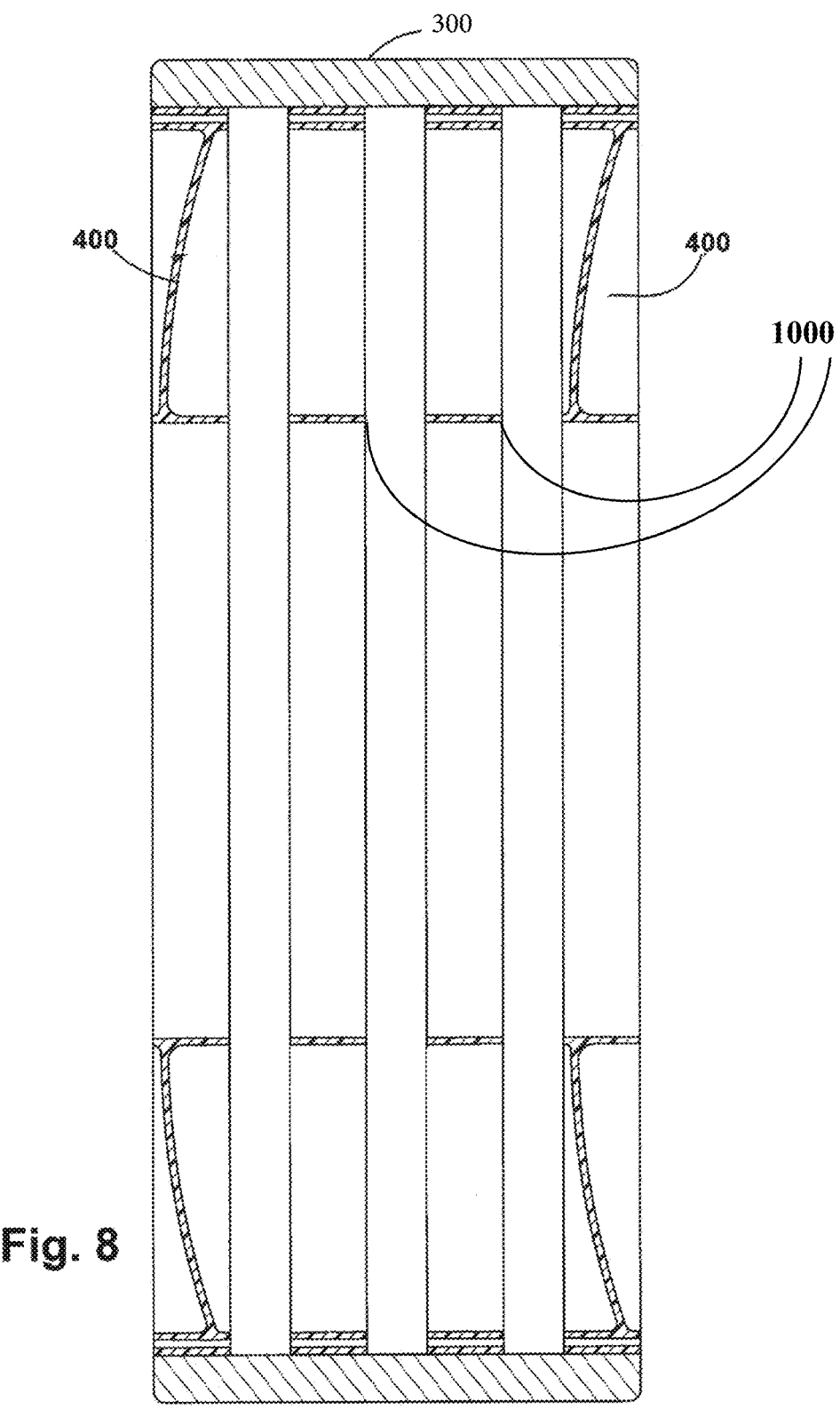
FIG. 8 is a cross-sectional view of an alternate embodiment of a non-pneumatic tire of the present invention illustrating multiple spoke disks with the same orientation.

The non-pneumatic tire of the present invention further includes at least one spoke disk 400,700,800, 900 or 1000 and preferably at least two disks which may be spaced apart at opposed ends of the non-pneumatic tire as shown in FIGS. 1B and 8. The spoke disks may have different cross-sectional designs as shown for example in FIGS. 4, 6, 7, 12, and 14. The spoke disk functions to carry the load transmitted from the shear layer. The disks are primarily loaded in tension and shear, and carry no load in compression. A first exemplary disk 400 that may be used in the non-pneumatic tire is shown in FIG. 2. The disk 400 is annular, and has an outer edge 406 and an inner edge 403 for receiving a metal or rigid reinforcement ring 405 to form a hub. Each disk as described herein has an axial thickness $A_S$ that is substantially less than the axial thickness AW of the non-pneumatic tire. The axial thickness $A_S$ is in the range of 5-20% of AW, more preferably 5-10% AW. If more than one disk is utilized, than the axial thickness of each disk may vary or be the same.

Each spoke disk has a spring rate $K_S$ which may be determined experimentally by measuring the deflection under a known load, as shown in FIG. 18a. One method for determining the spoke disk spring rate $K_S$ is to mount the spoke disk to a hub, and attaching the outer ring of the spoke disk to a rigid test fixture. A downward force is applied to the hub, and the displacement $\delta_2$ of the hub is recorded. The spring rate $K_S$ is determined from the slope of the force deflection curve as shown in FIG. 18b. It is preferred that the spoke disk spring rate be greater than the spring rate of the shear band. It is preferred that the spoke disk spring rate be in the range of 4 to 12 times greater than the spring rate of the shear band, and more preferably in the range of 6 to 10 times greater than the spring rate of the shear band.

Preferably, if more than one spoke disk is used, all of the spoke disks have the same spring rate. The spring rate of the non-pneumatic tire may be adjusted by increasing the number of spoke disks as shown in FIG. 8. Alternatively, the spring rate of each spoke disk may be different by varying the geometry of the spoke disk or changing the material. It is additionally preferred that if more than one spoke disk is used, that all of the spoke disks have the same outer diameter.

Figure 9:
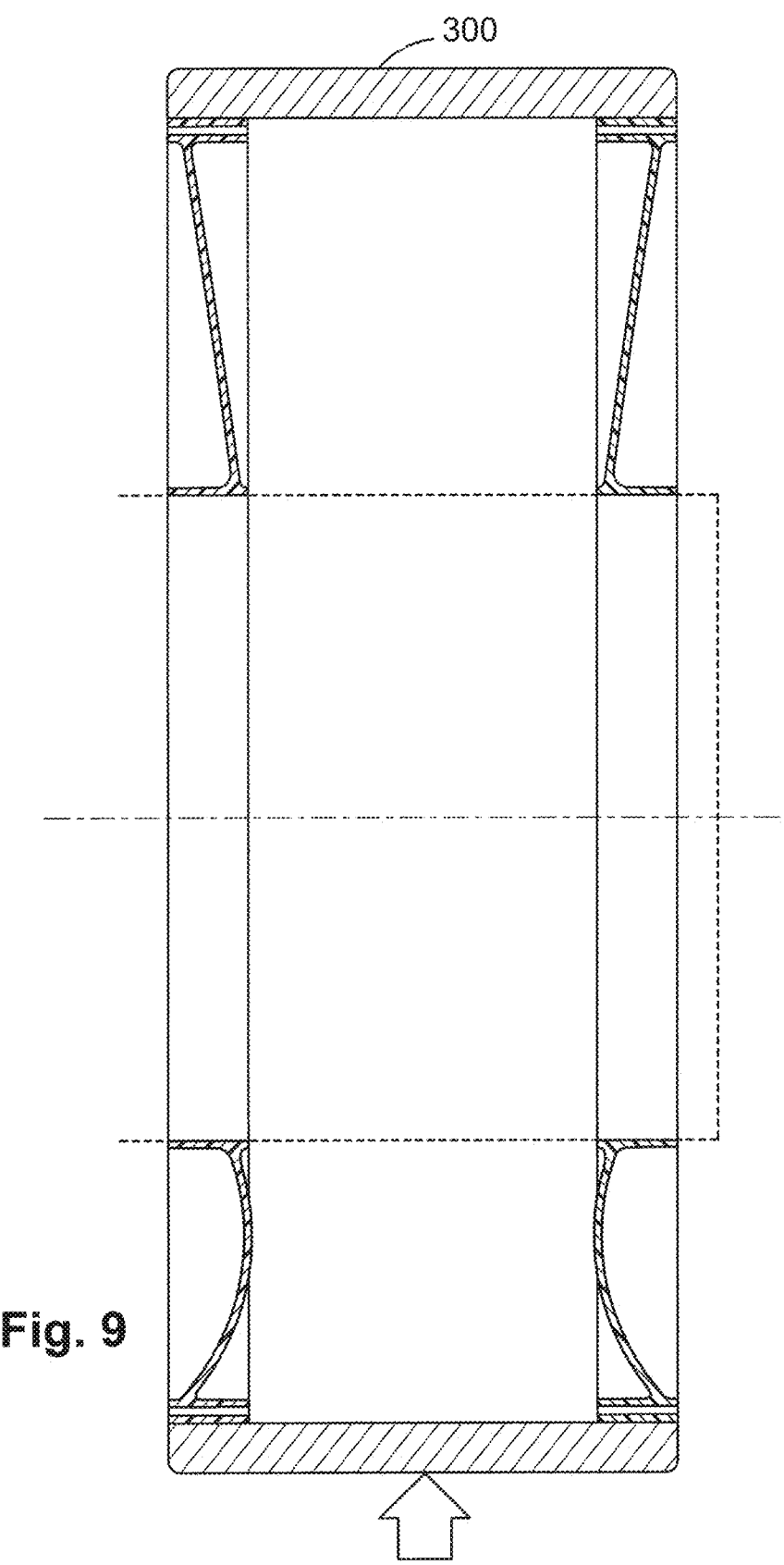
FIG. 9 is a cross-sectional view of the non-pneumatic tire of FIG. 1, shown with two spoke disks in opposed orientation so that the spokes bow axially inward when under load.
Figure 10:
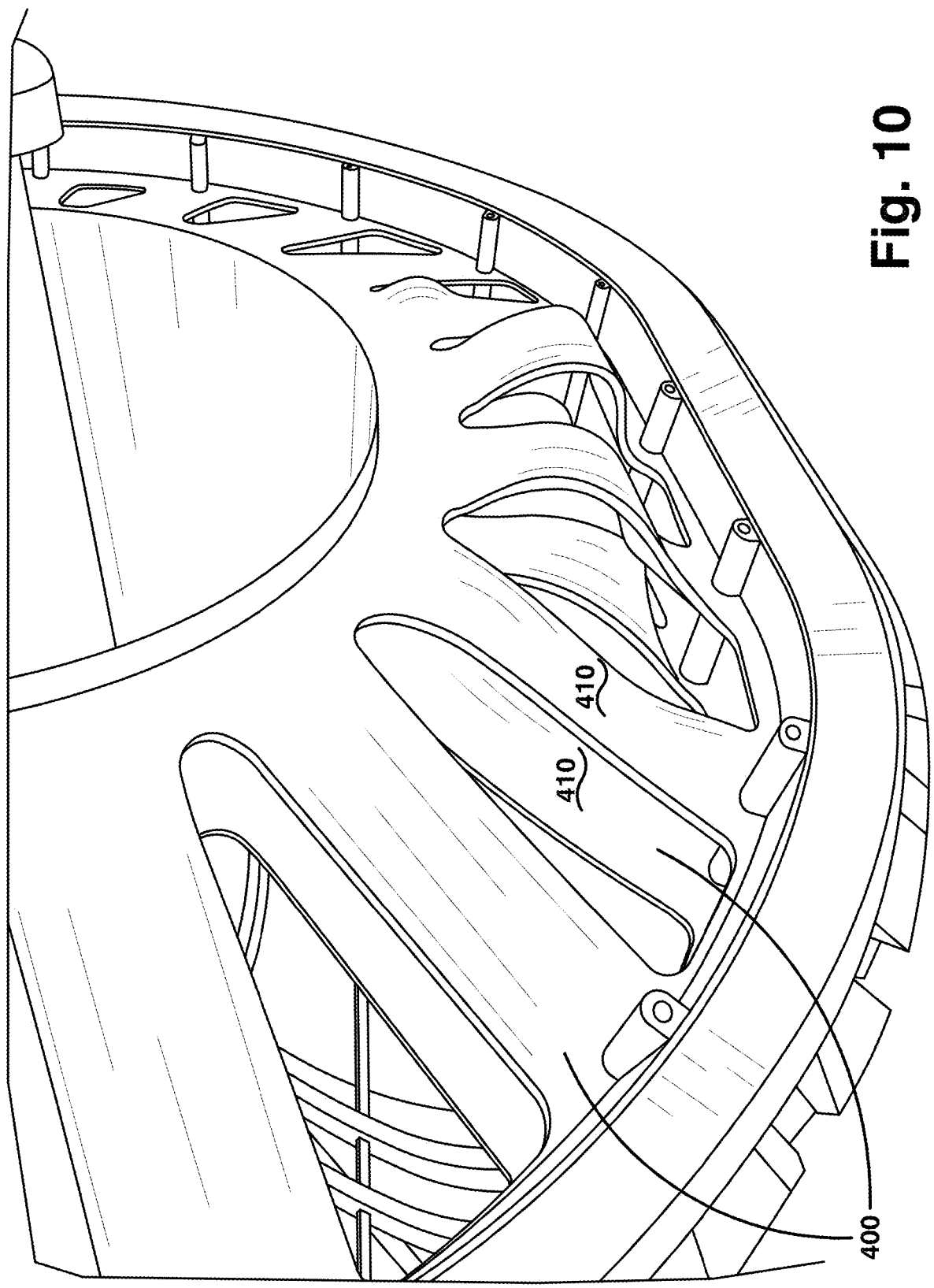
FIG. 10 is a cross-sectional view of the non-pneumatic tire of FIG. 1 shown with two disk spokes having a different orientation so that the spokes bow axially outward when under load.

FIG. 8 illustrates an alternate embodiment of a non-pneumatic tire having multiple spoke disks 400. The spokes 410 preferably extend in the radial direction. The spokes of disk 400 are designed to bulge or deform in an axial direction, so that each spoke deforms axially outward as shown in FIG. 10 or axially inward as shown in FIG. 9. If only two spoke disks are used, the spoke disks may be oriented so that each spoke disk bulges or deforms axially inward as shown in FIG. 9, or the opposite orientation such that the spoke disks bulge axially outward as shown in FIG. 10. When the non-pneumatic tire is loaded, the spokes will deform or axially bow when passing through the contact patch with substantially no compressive resistance, supplying zero or insignificant compressive force to load bearing. The predominant load of the spokes is through tension and shear, and not compression.

The spokes have a rectangular cross section as shown in FIG. 2, but are not limited to a rectangular cross-section, and may be round, square, elliptical, etc. Preferably, the spoke 410 has a cross-sectional geometry selected for longitudinal buckling, and preferably has a spoke width W to spoke axial thickness ratio, W/t, in the range of about 15 to about 80, and more preferably in the range of about 30 to about 60 and most preferably in the range of about 45 to about 55. A unique aspect of the preferred rectangular spoke design is the ability of the spokes to carry a shear load, which allows the spring stiffness to be spread between the spokes in tension and in shear loading. This geometric ability to provide shear stiffness is the ratio between the spoke thickness t and the radial height H of the spoke. The preferred ratio of H/t is in the range of about 2.5 and 25 (about means+/-10%) and more preferably in the range of about 10 to 20 (about means+/−10%), and most preferably in the range of 12-17.

Figure 3:
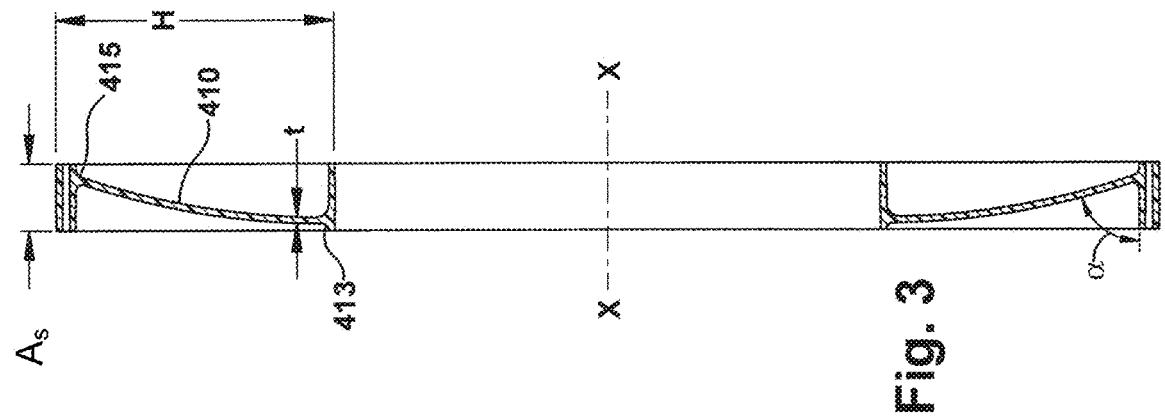
FIG. 3 is a schematic cross section view of the first embodiment of the spoke disk of FIG. 2.
Figure 11:
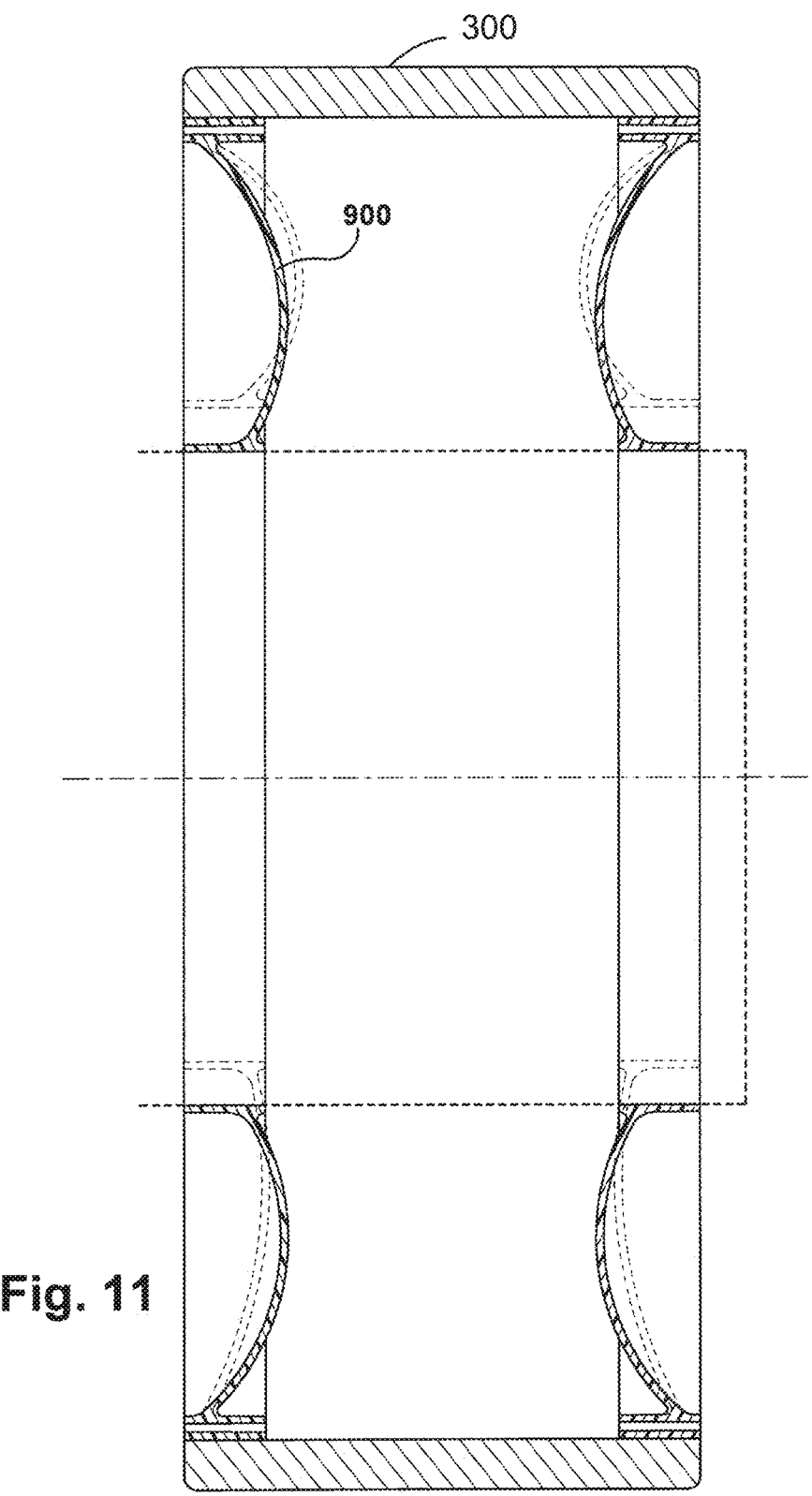
FIG. 11 is a cross-sectional view of the non-pneumatic tire of FIG. 1 shown with the disk spokes having a curved cross-section, shown under load.

The spokes preferably are angled in the radial plane at an angle α as shown in FIG. 3. The angle α is preferably in the range of 60 to 88 degrees, and more preferably in the range of 70 to 85 degrees. Additionally, the radially outer end 415 is axially offset from the radially inner end 413 of spoke 410 to facilitate the spokes bowing or deforming in the axial direction. Alternatively, the spokes 900 may be curved as shown in FIG. 11.

Figure 6:
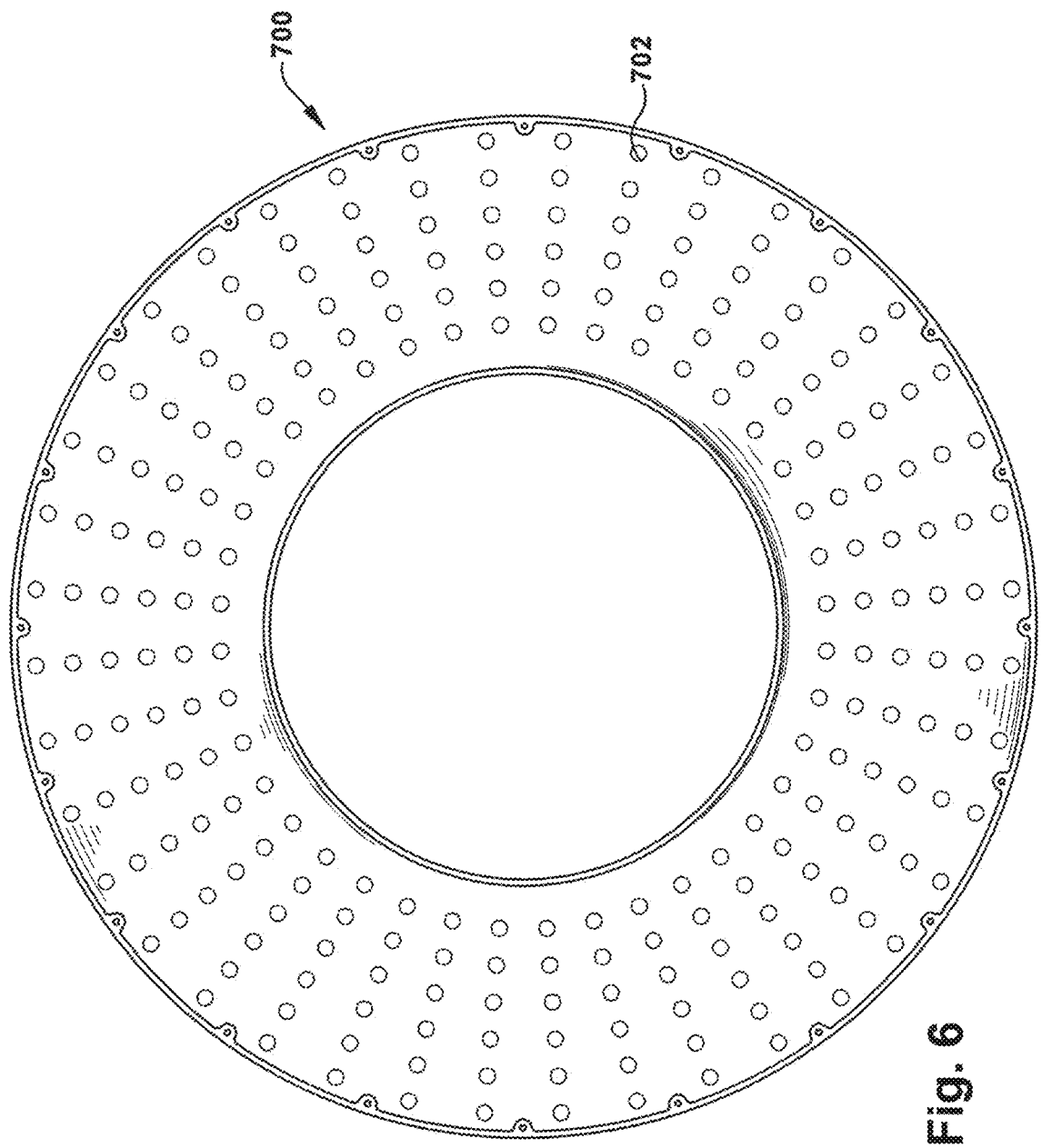
FIG. 6 is a second embodiment of a spoke disk of the present invention.

FIG. 6 is a second embodiment of a spoke disk 700. The spoke disk is annular, and primarily solid with a plurality of holes 702. The holes may be arranged in rows oriented in a radial direction. FIG. 7 is a third embodiment of a spoke disk 800. The spoke disk is annular and solid, with no holes. The cross-section of the spoke disk 700, 800 is the same as FIG. 3. The spoke disks 700, 800 have the same thickness, axial width as shown in FIG. 3.

Figure 12:
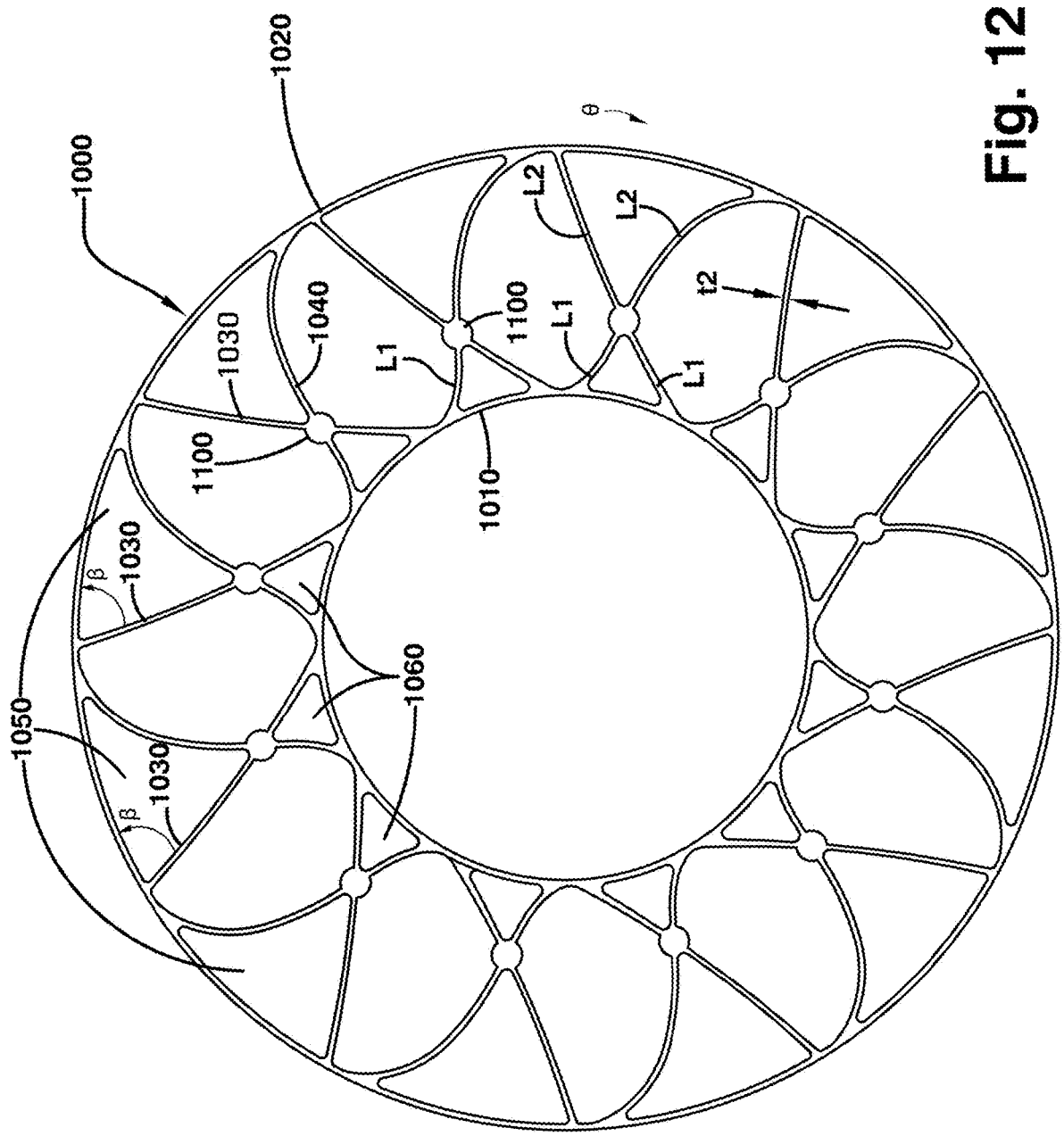
FIG. 12 is a front view of a fourth embodiment of a spoke disk of the present invention.
Figure 13:
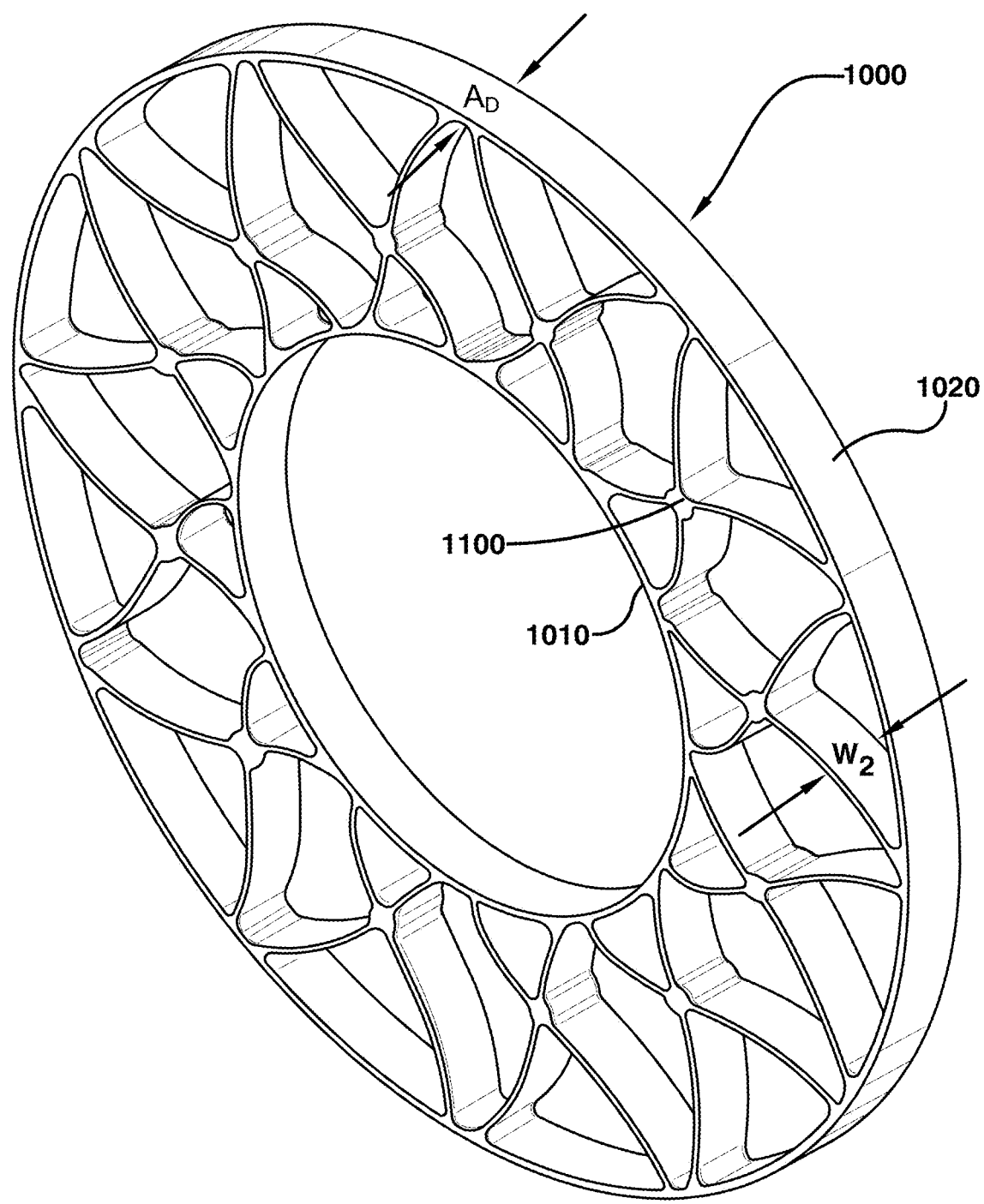
FIG. 13 is a perspective view of the fourth embodiment of the spoke disk of FIG. 12.

FIGS. 12-13 illustrates a fourth embodiment of a spoke disk 1000. The spoke disk 1000 has an axial thickness $A_D$ substantially less than the axial thickness AW of the non-pneumatic tire. The spoke disk 1000 has a plurality of spokes that connect an inner ring 1010 to an outer ring 1020. The shear band 300 is mounted radially outward of the spoke disks. The spoke disk 1000 has a first spoke 1030 that is linear and joins the outer ring 1020 to the inner ring 1010. The first spoke 1030 forms an angle β with the outer ring 1020 in the range of 20 to 80 degrees. β is preferably less than 90 degrees. The spoke disk 1000 further includes a second spoke 1040 that extends from the outer ring 1020 to the inner ring 1010, preferably in a curved shape. The second spoke 1040 is joined with the first spoke 1030 at a junction 1100. The curved spoke 1040 has a first curvature from the outer ring to the junction 1100, and a second curvature from the junction to the inner ring 1010. In this example, the first curvature is convex, and the second curvature is concave. The shaping or curvature of the first and second spokes control how the blades deform when subject to a load. The blades of the spoke disk 1000 are designed to buckle in the angular direction θ.

Figure 16:
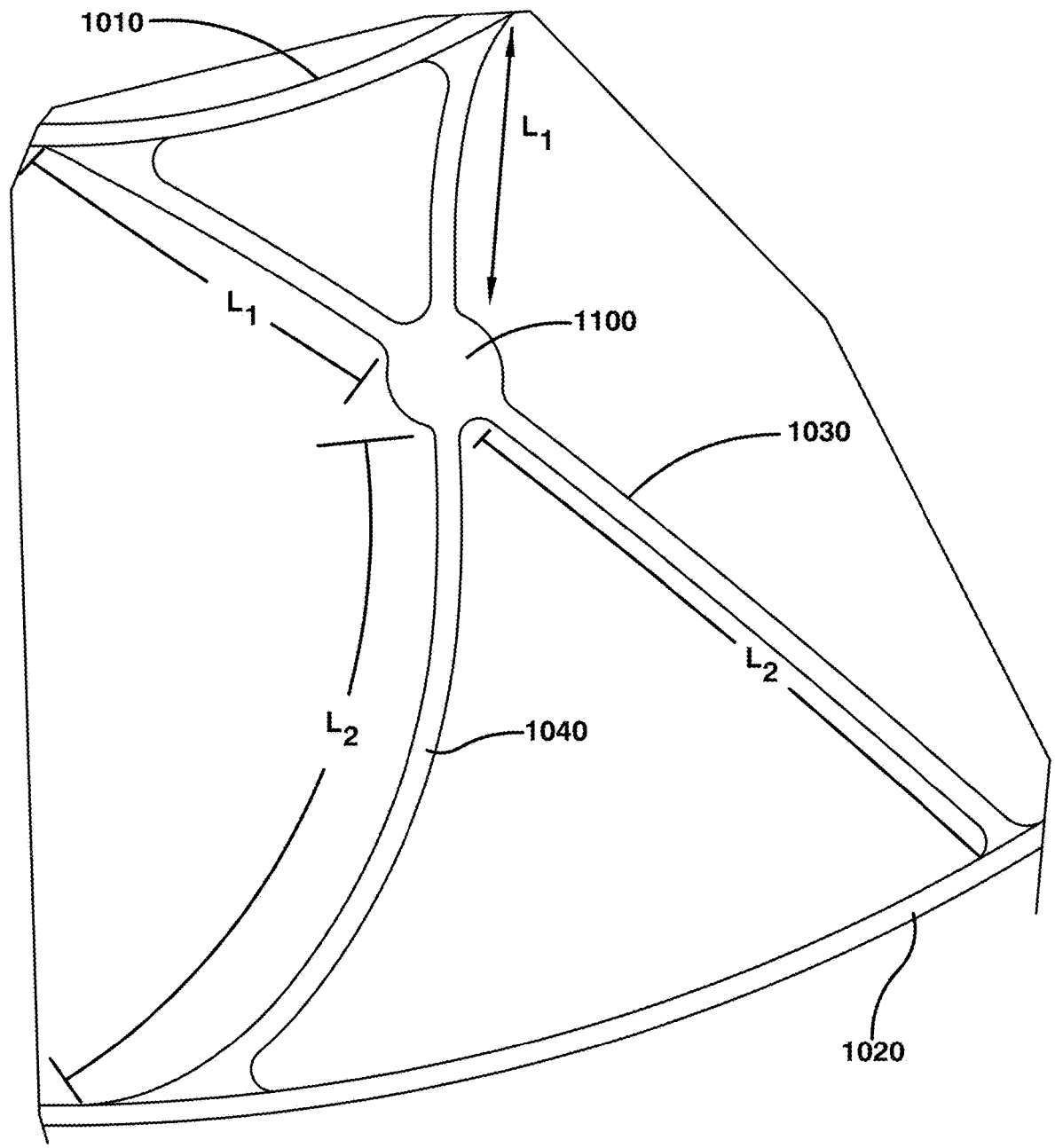
FIG. 16 is a close-up view of the first and second spoke members of the fourth, fifth embodiments of FIGS. 12,14.

The joining of the first spoke 1030 to the second spoke 1040 by the junction results in an upper and lower generally shaped triangles 1050,1060. The radial height of the junction 1100 can be varied as shown in FIG. 16, by varying the ratio of $L_1/L_2$. The ratio of $L_1/L_2$ may be in the range of 0.2 to 5, and preferably in the range of 0.3 to 3, and more preferably in the range of 0.4 to 2.5, and most preferably in the range of 0.5 to 2. The spokes 1030,1040 have a spoke thickness t in the range of 2-5 mm, and an axial width W in the axial direction in the range of about 25-35 mm. The ratio of the spoke axial width $W_2$ to thickness $t_2$, $W_2/t_2$ is in the range of 9-22, more preferably 9-11. The spoke disk 1000 is designed to carry the load primarily in tension, while the other spoke disks 400,700, 800 are able to carry the load both in tension and in shear. The spoke disk 1000 buckles in the radial plane, while the other spoke disks 400,700, 800 are designed to buckle in a different plane in the axial direction.

Figure 14:
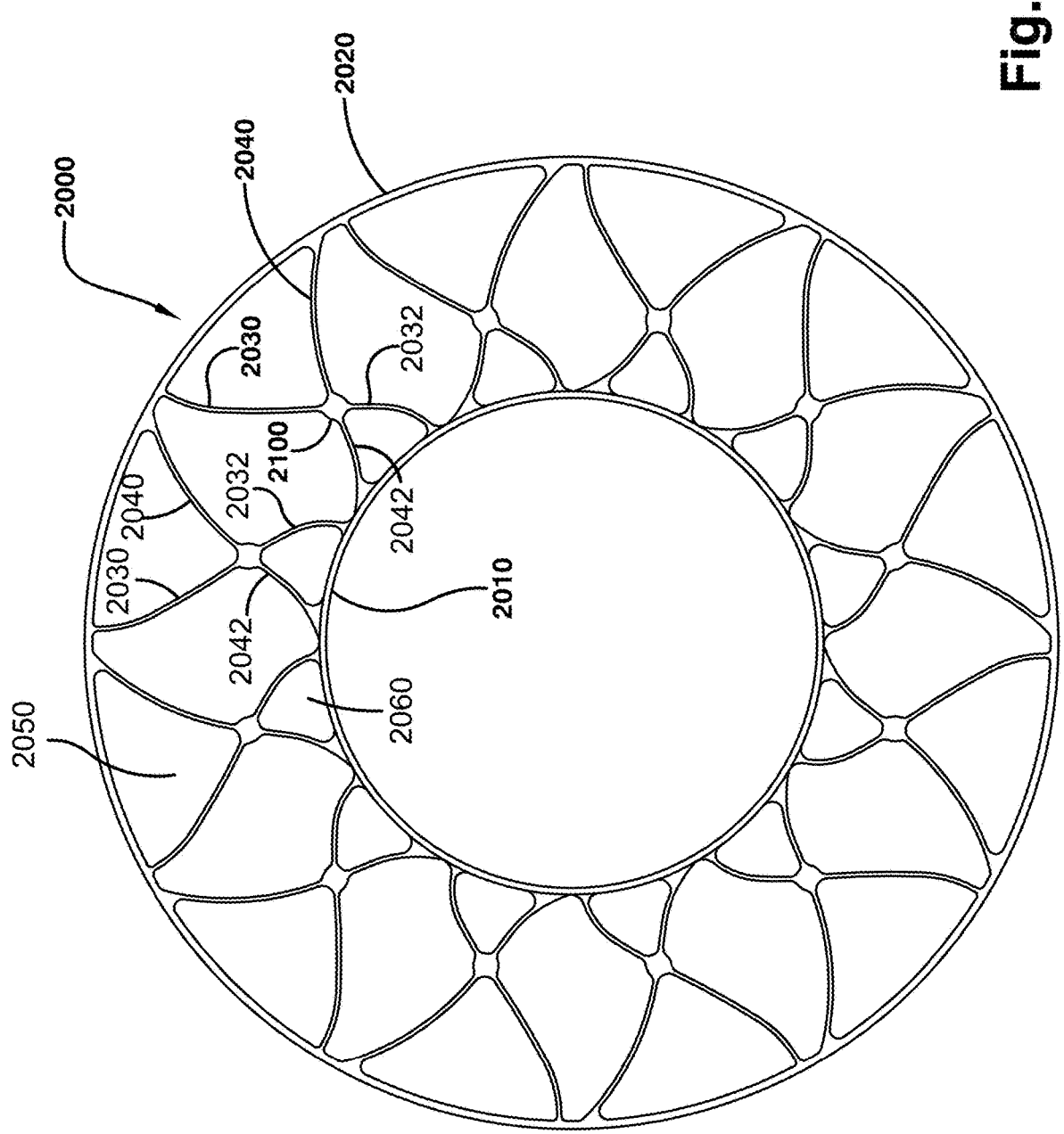
FIG. 14 is a front view of a fifth embodiment of a spoke disk of the present invention.
Figure 15:
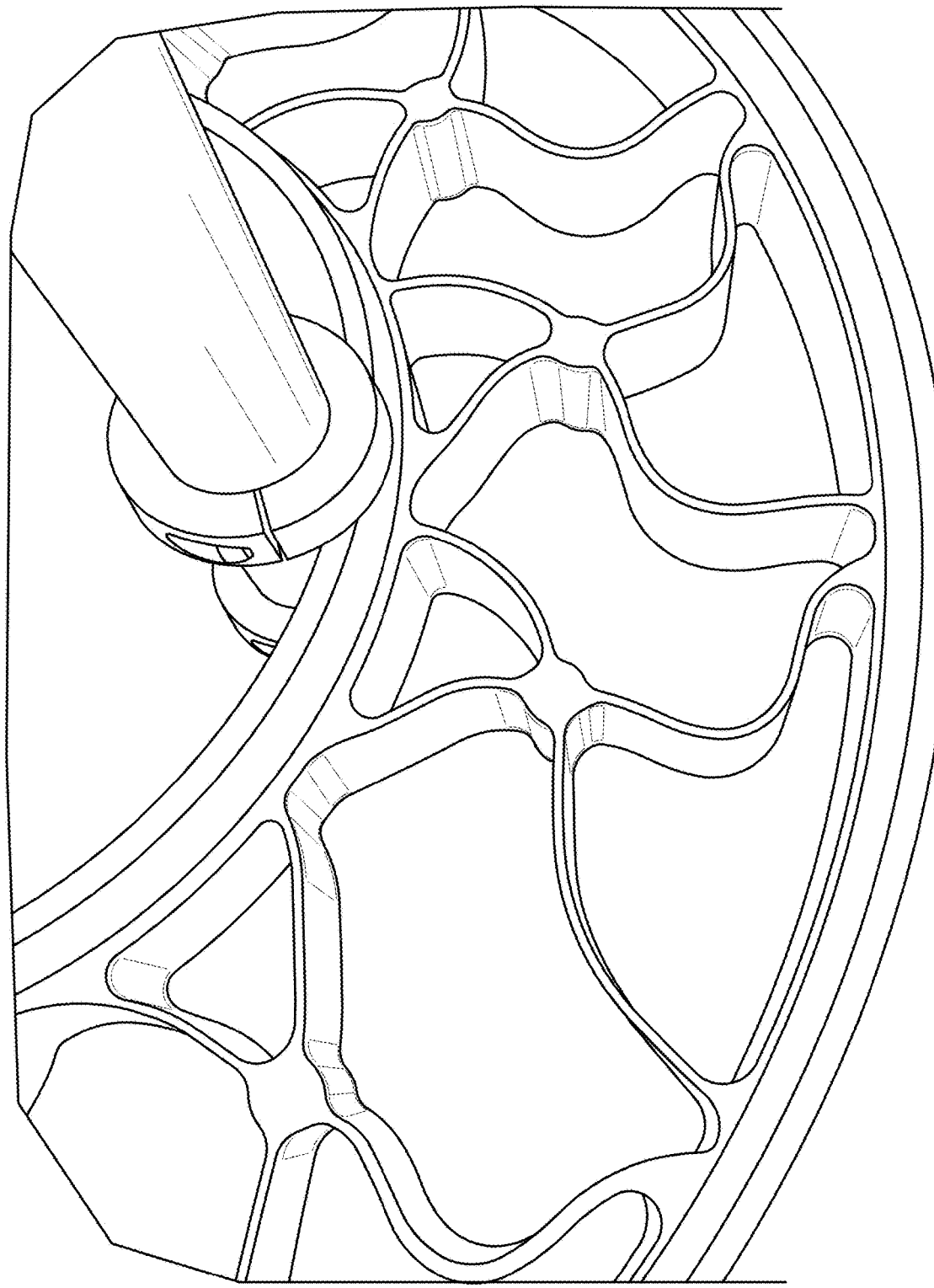
FIG. 15 is a perspective view of the fifth embodiment of the spoke disk of FIG. 14 shown under loading.

FIG. 14 illustrates a fifth embodiment of a spoke disk 2000, which is similar to the spoke disk 1000, except for the following differences. The spoke disk 2000 has a first and second spoke 2030, 2040 which are joined together by a junction 2100, forming two approximate triangular shapes 2050,2060, that have curved boundaries. Both the first and second spokes 2030,2040 extend from an outer ring 2020 to an inner ring 2010. Both the first and second spokes 2030, 2040 are curved. The curve of the outer radial portion 2040 of each spoke has a first curvature, and the inner radial portions 2042 each has a curve in the opposite direction of the first curvature. FIG. 15 illustrates the spoke disk 2000 buckling under load. The radially outer portions of 2040, 2030 buckle in the angular direction.

A preferred embodiment of a non-pneumatic tire is shown in FIG. 1B. The spoke disks on the outer axial ends are the spoke disks 400, and are oriented so that they buckle axially outward. Located between the opposed spoke disks 400 are at least one disk 1000,2000. The outer spoke disks are designed to carry both shear and tension loads, while the disks 1000,2000 carry loads in tension only. The number of inner disks may be selected as needed. The outer disks buckle in a first plane, while the inner disks buckle in a different plane. The disks 1000,2000 are designed to be laterally stiff, so that they can be combined to tune the tire lateral stiffness. The outer disks 400 are not as stiff in the lateral direction as the disks 1000,2000.

The spoke disks are preferably formed of an elastic material, more preferably, a thermoplastic elastomer. The material of the spoke disks is selected based upon one or more of the following material properties. The tensile (Young's) modulus of the disk material is preferably in the range of 45 MPa to 650 MPa, and more preferably in the range of 85 MPa to 300 MPa, using the ISO 527-1/-2 standard test method. The glass transition temperature is less than −25 degree Celsius, and more preferably less than −35 degree Celsius. The yield strain at break is more than 30%, and more preferably more than 40%. The elongation at break is more than or equal to the yield strain, and more preferably, more than 200%. The heat deflection temperature is more than 40 degree C. under 0.45 MPa, and more preferably more than 50 degree C. under 0.45 MPa. No break result for the Izod and Charpy notched test at 23 degree C. using the ISO 17911S0180 test method. Two suitable materials for the disk is commercially available by DSM Products and sold under the trade name ARNITEL PL 420H and ARNITEL PL461.

Applicants understand that many other variations are apparent to one of ordinary skill in the art from a reading of the above specification. These variations and other variations are within the spirit and scope of the present invention as defined by the following appended claims.

What is claimed:

1. A structurally supported non-pneumatic tire comprising a ground contacting annular tread portion;
a shear band, wherein the shear band includes a first and a second reinforced elastomer layer separated by a shear matrix; and at least two spoke disks connected to the shear band, wherein each spoke disk are spaced apart from each other, wherein each spoke disk has a first and a second spoke, wherein each spoke extends between an outer ring and an inner ring, wherein the first spoke extends from the outer ring to the inner ring in a curved manner and is joined to the second spoke forming a junction, wherein each spoke disk has an axial thickness less than an axial thickness of the tire, wherein the first spoke and the second spoke each have a portion that buckles under load in the same angular direction.

2. The structurally supported non-pneumatic tire of claim 1 wherein the second spoke extends from the outer ring to the inner ring in a straight manner.

3. The structurally supported non-pneumatic tire of claim 1 wherein the spring rate of the spoke disk is greater than the spring rate of the shear band.

4. The structurally supported non-pneumatic tire of claim 1 wherein an axial thickness of the spoke disk is greater than a thickness of the spoke.

5. The structurally supported non-pneumatic tire of claim 1 wherein a ratio of a spoke axial width $W_2$ to a spoke thickness $t_2$, $W_2/t_2$ is in the range of 8 to 12.

6. The structurally supported non-pneumatic tire of claim 1 wherein a ratio of a spoke axial width $W_2$ to a spoke thickness $t_2$, $W_2/t_2$ is in the range of 9 to 22.

7. The structurally supported non-pneumatic tire of claim 1 wherein each spoke has a length L2 from the outer ring to the junction, and a length L1 from the junction to the inner ring, wherein the ratio of L1/L2 of each spoke is in the range of 0.2 to 5.

8. The structurally supported non-pneumatic tire of claim 1 wherein each spoke has a length L2 from the outer ring to the junction, and a length L1 from the junction to the inner ring, wherein the ratio of L1/L2 of each spoke is in the range of 0.5 to 2.

9. A non-pneumatic tire comprising
a ground contacting annular tread portion;
a shear band, wherein the shear band includes a first and a second reinforced elastomer layer separated by a shear matrix; and at least two spoke disks connected to the shear band, wherein each spoke disk are spaced apart from each other, wherein each spoke disk has a first and a second spoke, wherein each spoke extends between an outer ring and an inner ring, wherein the first spoke extends from the outer ring to the inner ring in a curved manner and is joined to the second spoke forming a junction, wherein each spoke disk has an axial thickness less than an axial thickness of the tire, wherein the first spoke and the second spoke each have a portion that bends under load in the same direction with respect to each other.

* * * * *